US012573356B2

(12) United States Patent
Luo et al.

(10) Patent No.: US 12,573,356 B2
(45) Date of Patent: Mar. 10, 2026

(54) ANTI-FLICKER METHOD AND APPARATUS FOR ANDROID WHITEBOARD

(71) Applicant: Guangzhou LANGO Electronic Technology Co., Ltd., Guangzhou (CN)

(72) Inventors: Wen Luo, Guangzhou (CN); Tao Tang, Guangzhou (CN); Shaobin Su, Guangzhou (CN)

(73) Assignee: Guangzhou LANGO Electronic Technology Co., Ltd., Guangzhou (CN)

( * ) Notice: Subject to any disclaimer, the term of this patent is extended or adjusted under 35 U.S.C. 154(b) by 135 days.

(21) Appl. No.: 18/420,806

(22) Filed: Jan. 24, 2024

(65) Prior Publication Data

US 2024/0203378 A1 Jun. 20, 2024

Related U.S. Application Data

(63) Continuation-in-part of application No. PCT/CN2022/101363, filed on Jun. 27, 2022.

(30) Foreign Application Priority Data

Jul. 30, 2021 (CN) ........................ 202110867292.9

(51) Int. Cl.
*G09G 5/32* (2006.01)

(52) U.S. Cl.
CPC ....... *G09G 5/32* (2013.01); *G09G 2340/0464* (2013.01); *G09G 2340/12* (2013.01)

(58) Field of Classification Search
None
See application file for complete search history.

(56) References Cited

U.S. PATENT DOCUMENTS 12,254,174 B2 * 3/2025 Xu ........................ G06F 1/1677
2016/0062552 A1 * 3/2016 Jeong .................... G06F 3/0488 715/788
2022/0269405 A1 * 8/2022 Wu ................... H04M 1/72439
2024/0264850 A1 * 8/2024 Liu ...................... G06F 3/04883
2024/0329803 A1 * 10/2024 Johnson ................ G06F 3/1454

* cited by examiner

*Primary Examiner* — James A Thompson

(57) ABSTRACT

The present application discloses an anti-flicker method and apparatus for an Android whiteboard, wherein the method includes: determining a drawing canvas, and locking a display screen of the Android whiteboard, wherein the display screen is used to display a canvas drawing result; acquiring relevant data of a floating window; creating a target canvas by cropping the drawing canvas based on the relevant data; unlocking the display screen, and executing a drawing function through the target canvas. Since the Android whiteboard uses the target canvas created based on the floating window outline for drawing, thus, when the Android whiteboard needs to display a writing trajectory crossing over other floating window controls covering the Android whiteboard interface, it does not show the writing trajectory, thereby avoiding the occurrence of jaggies.

12 Claims, 3 Drawing Sheets

ANTI-FLICKER METHOD AND APPARATUS FOR ANDROID WHITEBOARD

CROSS REFERENCE TO RELATED APPLICATIONS

The present application is a Continuation-In-Part Application of PCT Application No. PCT/CN2022/101363 filed on Jun. 27, 2022, which claims the benefit of Chinese Patent Application No. 202110867292.9 filed on Jul. 30, 2021. All the above are hereby incorporated by reference in their entirety.

FIELD OF THE INVENTION

The embodiments of the present application relate to the field of image communication, particularly to an anti-flicker method and apparatus for an Android whiteboard.

BACKGROUND OF THE INVENTION

The development of technology has led to the transition from blackboards to whiteboards. Nowadays, electronic whiteboards are extensively used in various all-in-one devices supporting touch and writing functions. In existing technologies, to enhance the writing experience of electronic whiteboards, a common approach is to utilize whiteboard acceleration solutions. In these solutions, electronic whiteboards control the refreshment mechanism on the video memory content aiming to improve writing performance and achieve better smoothness. However, directly manipulating the video memory content through the whiteboard acceleration mechanism causes noticeable jaggies when the electronic whiteboard displays a writing trajectory crossing over other floating window controls covering the whiteboard interface. This is because, when the writing trajectory on the electronic whiteboard crosses over other floating window controls covering the whiteboard interface, the entire rectangular background where the floating windows are located is acquired and the entire rectangular is textured with the minimum unit rectangle.

SUMMARY OF THE INVENTION

The embodiments of the present application provide an anti-flicker method and apparatus for an Android whiteboard. In these embodiments, the Android whiteboard uses a target canvas created based on a floating window outline for drawing, thus, when the Android whiteboard needs to display a writing trajectory crossing over other floating window controls covering the Android whiteboard interface, it does not show the writing trajectory, thereby avoiding the occurrence of jaggies.

In a first aspect, an embodiment of the present application provides an anti-flicker method for an Android whiteboard, including:

determining a drawing canvas, and locking a display screen of the Android whiteboard, wherein the display screen is used to display a canvas drawing result;

acquiring relevant data of a floating window;

setting a pre-cropping area on the drawing canvas based on the relevant data;

creating a target canvas by cropping the pre-cropping area on the drawing canvas, wherein the cropping includes overlay-type cropping and hidden-type cropping;

unlocking the display screen, and executing a drawing function through the target canvas.

Alternatively, the process of acquiring relevant data of a floating window including:

determining a coordinate position corresponding to the floating window, and acquiring a floating window outline corresponding to the floating window;

determining the relevant data based on the coordinate position and the floating window outline.

Alternatively, before the process of creating a target canvas by cropping the pre-cropping area on the drawing canvas, the method further includes:

checking whether the pre-cropping area is consistent with a current cropping area;

if it is not, resetting the drawing canvas;

Alternatively, before the process of determining a drawing canvas, the method further includes:

calculating a screen size of the display screen;

the process of determining a drawing canvas includes:

determining the drawing canvas based on the screen size.

In a second aspect, an embodiment of the present application provides an anti-flicker apparatus for an Android whiteboard, including:

a determining and locking unit, configured to determine a drawing canvas, and lock a display screen of the Android whiteboard, wherein the display screen is used to display a canvas drawing result;

an acquiring unit, configured to acquire relevant data of a floating window;

a creating unit, configured to set a pre-cropping area on the drawing canvas based on the relevant data and create a target canvas by cropping the pre-cropping area on the drawing canvas;

an unlocking and drawing unit, configured to unlock the display screen, and execute a drawing function through the target canvas.

Alternatively, the acquiring unit includes:

a determining and acquiring module, configured to determine a coordinate position corresponding to the floating window, and acquire a floating window outline corresponding to the floating window;

a determining module, configured to determine the relevant data based on the coordinate position and the floating window outline.

Alternatively, the creating unit includes:

a setting module, configured to set a pre-cropping area on the drawing canvas based on the relevant data;

a creating unit, configured to create a target canvas by cropping the pre-cropping area on the drawing canvas.

Alternatively, the apparatus further includes:

a checking unit, configured to check whether the pre-cropping area is consistent with a current cropping area;

a resetting unit, configured to reset the drawing canvas when the checking unit determines that the pre-cropping area is not consistent with the current cropping area.

Alternatively, the apparatus further includes:

a calculating unit, configured to calculate a screen size of the display screen;

the determining and locking unit is further configured to determine the drawing canvas based on the screen size.

In a third aspect, an embodiment of the present application provides an anti-flicker apparatus for an Android whiteboard, including:

a processor, a memory, an input and output device, and a bus; the processor is connected to the memory, the input and output device and the bus.

The processor executes the following operations:

determining a drawing canvas, and locking a display screen of the Android whiteboard, wherein the display screen is used to display a canvas drawing result;

acquiring relevant data of a floating window;

setting a pre-cropping area on the drawing canvas based on the relevant data;

creating a target canvas by cropping the pre-cropping area on the drawing canvas, wherein the cropping includes overlay-type cropping and hidden-type cropping;

unlocking the display screen, and executing a drawing function through the target canvas.

An embodiment of the present application provides a computer-readable storage medium, wherein the computer-readable storage medium stores thereon a program, the program is executed on a computer to execute the above-mentioned acceleration method.

In the above technical solutions: before the Android whiteboard is used for drawing, firstly the drawing canvas is determined and the display screen of the Android whiteboard is locked, wherein the display screen is used to display the canvas drawing result. Then, the relevant data of the floating window is acquired. Subsequently, the target canvas is created by cropping the drawing canvas based on the relevant data. Finally, the display screen is unlocked and the drawing function is executed through the target canvas. Since the Android whiteboard uses the target canvas created based on the floating window outline for drawing, thus, when the Android whiteboard needs to display a writing trajectory crossing over other floating window controls covering the Android whiteboard interface, it does not show the writing trajectory, thereby avoiding the occurrence of jaggies.

DETAILED DESCRIPTION OF THE INVENTION

The embodiments of the present application provide an anti-flicker method and apparatus for an Android whiteboard. In these embodiments, the Android whiteboard uses a target canvas created based on a floating window outline for drawing, thus, when the Android whiteboard needs to display a writing trajectory crossing over other floating window controls covering the whiteboard interface, it does not show the writing trajectory, thereby avoiding the occurrence of jaggies.

Figure 1:
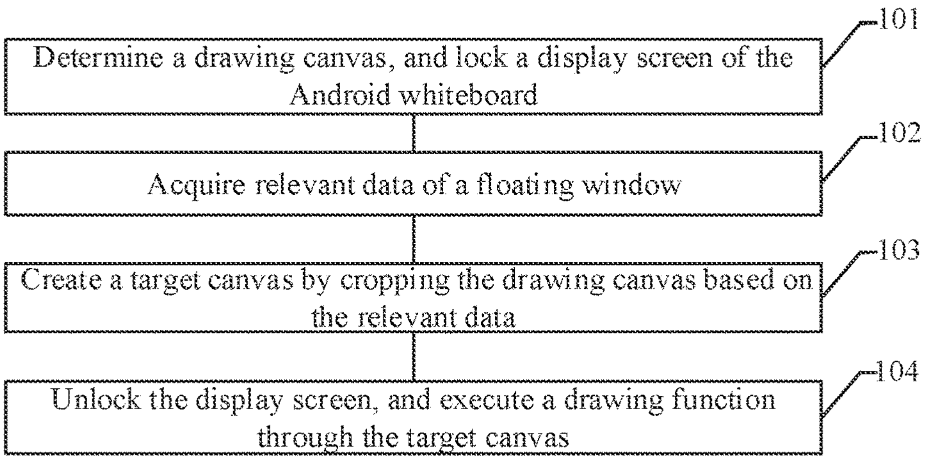
FIG. 1 is a schematic diagram of a flowchart of an anti-flicker method for an Android whiteboard according to one of the embodiments of the present application.
Figure 5:
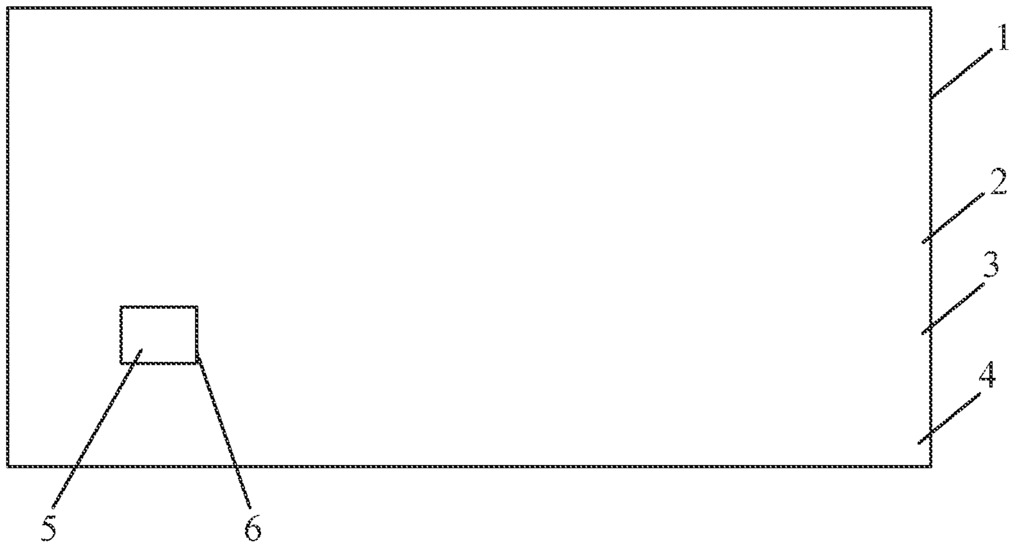
FIG. 5 is a schematic diagram of an Android whiteboard according to one of the embodiments of the present application.

Please refer to FIG. 1 and FIG. 5. An anti-flicker method for an Android whiteboard provided by one of the embodiments of the present application includes:

101, determining a drawing canvas, and locking a display screen of the Android whiteboard, wherein the display screen is used to display a canvas drawing result.

In this embodiment, as the Android whiteboard 1 is used for drawing, it is necessary to determine the drawing canvas 3 before Android whiteboard 1 is used for drawing. Additionally, since a target canvas 4 in this embodiment has not been determined, it is required to lock the video memory control before the target canvas 4 is determined, to prevent the system from refreshing the Android drawing whiteboard automatically, i.e., the system locks the display screen 2 of Android whiteboard 1, wherein the display screen 2 is used to display the canvas drawing result.

102, acquiring relevant data of a floating window.

In this embodiment, in a case where the Android whiteboard 1 needs to be used for drawing while there is a floating window 5 on Android whiteboard 1, it is necessary to acquire the relevant data of the floating window 5. The relevant data is used to determine a corresponding location of the floating window 5. After the location of the floating window 5 is determined, the next step is to determine a location corresponding to the floating window 5 on the drawing canvas 3 based on the location of the floating window 5.

103, creating a target canvas by cropping the drawing canvas based on the relevant data.

In this embodiment, after determining the location corresponding to the floating window 5 on the drawing canvas 3 based on the relevant data, in order to avoid the occurrence of jaggies when the writing trajectory crosses the floating window 5, this embodiment directly crops the location area corresponding to the floating window 5 on the drawing canvas 3 and designates the canvas formed after cropping as the target canvas 4.

When cropping the drawing canvas 3, an overlay-type method may be employed for cropping. In the overlay-type method, the location area corresponding to the floating window 5 on the drawing canvas 3 is covered, i.e., preventing drawing in that location area. Alternatively, a hidden-type method may also be used for cropping, i.e., directly hiding the writing trajectory that crosses over the floating window 5.

In this embodiment, the cropping of the drawing canvas 3 can be performed using an overlay-type cropping method to crop the drawing canvas or a hidden-type cropping method to crop the drawing canvas. Specific details are not explicitly specified at this point.

104, unlocking the display screen, and executing a drawing function through the target canvas.

Once the target canvas is determined, drawing can be conducted on the target canvas. When using this target canvas for drawing, it is necessary to unlock the display screen to enable the display of the writing trajectory during the drawing.

Before the Android whiteboard 1 is used for drawing, firstly the drawing canvas 3 is determined and the display screen 3 of the Android whiteboard 1 is locked, wherein the display screen 3 is used to display the canvas drawing result. Then, the relevant data of the floating window 5 is acquired. Subsequently, the target canvas 4 is created by cropping the drawing canvas 3 based on the relevant data. Finally, the display screen 2 is unlocked and the drawing function is executed through the target canvas 4. Since the Android whiteboard 1 uses the target canvas 4 created based on the outline of floating window 5 for drawing, thus, when the Android whiteboard 1 needs to display a writing trajectory crossing over other floating window controls covering the whiteboard interface, it does not show the writing trajectory, thereby avoiding the occurrence of jaggies.

Figure 2:
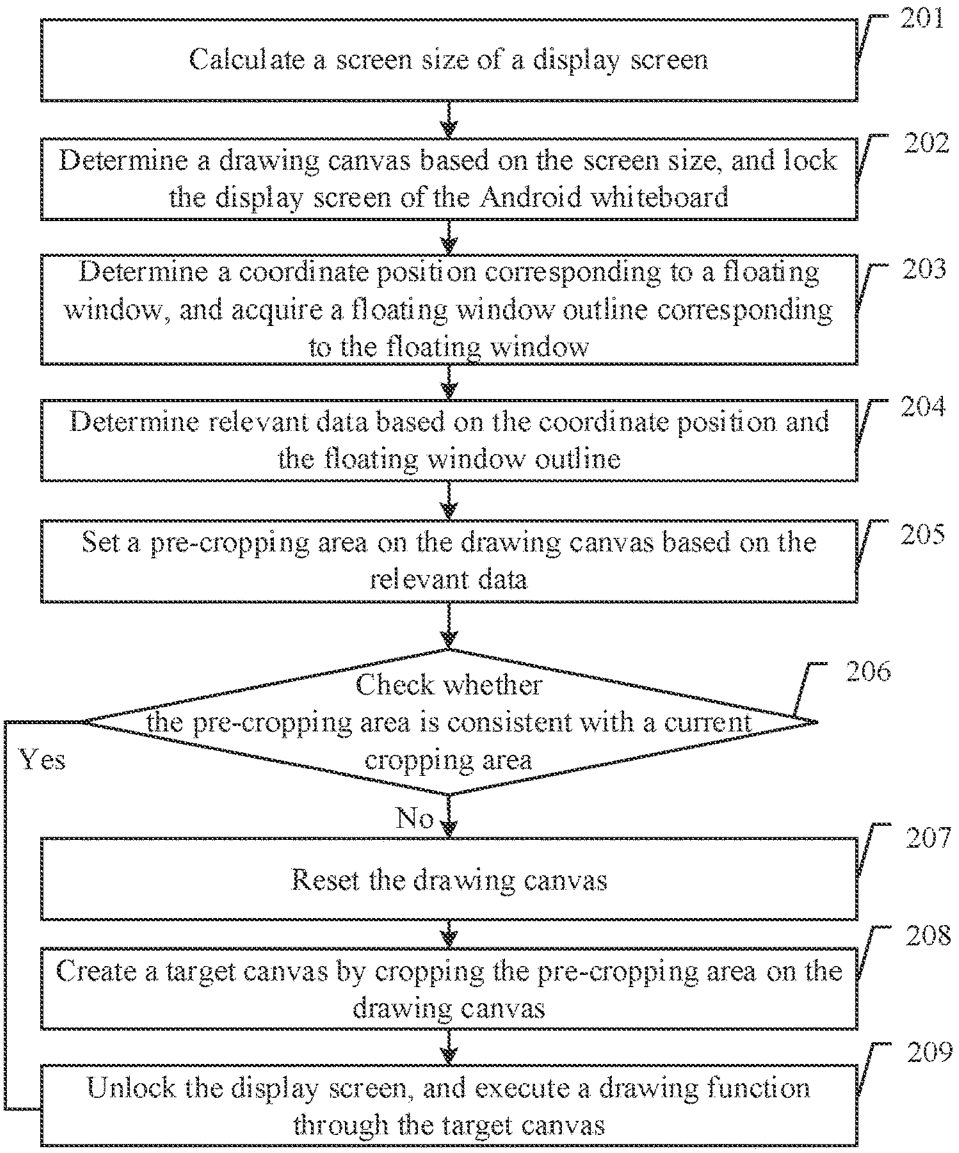
FIG. 2 is a schematic diagram of a flowchart of an anti-flicker method for an Android whiteboard according to another one of the embodiments of the present application.

Please refer to FIG. 2. An anti-flicker method for an Android whiteboard provided by another one of the embodiments of the present application includes:

201, calculating a screen size of a display screen;

To maximize the drawing space of drawing canvas 3 and make it fit the display screen 2, the screen size of the display screen 2 of the Android whiteboard 1 is calculated before the drawing canvas 3 is determined. Specifically, this process involves firstly determining a coordinate of a top-left vertex of the display screen 2 of the Android whiteboard 1; next, determining a coordinate of a top-right vertex of the display screen 2 of the Android whiteboard 1, then determining a length of the display screen 2 of the Android whiteboard 1 based on the coordinate of the top-left vertex and the coordinate of the top-right vertex; subsequently, determining a coordinate of a bottom-left vertex of the display screen 2 of the Android whiteboard 1, and determining a width of the display screen 2 of the Android whiteboard 1 based on the coordinate of the top-left vertex and the coordinate of the bottom-left vertex; finally, determining the screen size of the display screen 2 based on the length and width of the display screen 2.

In this embodiment, the length of the display screen 2 of the Android whiteboard 1 may be determined based on the coordinate of the top-left vertex and the coordinate of the top-right vertex. Alternatively, the length of the display screen 2 of the Android whiteboard 1 may be determined based on the coordinate of the bottom-left vertex and the coordinate of the bottom-right vertex. Specific details are not explicitly specified at this point.

In this embodiment, the width of the display screen 2 of the Android whiteboard 1 may be determined based on the coordinate of the top-left vertex and the coordinate of the bottom-left vertex. Alternatively, the width of the display screen 2 of the Android whiteboard 1 may be determined based on the coordinate of the top-right vertex and the coordinate of the bottom-right vertex. Specific details are not explicitly specified at this point.

In this embodiment, the screen size of the display screen 2 may be determined based on the length and width of the display screen 2. Alternatively, the screen size of the display screen 2 may also be calculated based on a line segment formed by connecting the top-left vertex and the bottom-right vertex, along with the top-right vertex. Specific details are not explicitly specified at this point.

202, determining a drawing canvas based on the screen size, and locking the display screen of the Android whiteboard, wherein the display screen is used to display a canvas drawing result.

After the screen size of the display screen 2 of the Android whiteboard 1 is determined, the size and location of the drawing canvas 3 are set based on the screen size. This ensures that the drawing canvas 3 fit the display screen 2 and maximizes the drawing space utilized by the drawing canvas 3. In this embodiment, before the target canvas 4 is determined, in order to prevent the system from refreshing the Android drawing whiteboard automatically, the display screen 2 is locked, wherein the display screen 2 is used to display the canvas drawing result.

203, determining a coordinate position corresponding to a floating window, and acquiring a floating window outline corresponding to the floating window.

In this embodiment, in a case where the Android whiteboard 1 needs to be used for drawing while there is a floating window 5 on Android whiteboard 1, it is necessary to acquire the location corresponding to the floating window 5 and the floating window outline corresponding to the floating window 5. Specifically, this involves acquiring all collection points of the floating window 5 on the display screen 2, choosing a central point of all the collection points as the coordinate position of the floating window 5, choosing all edge points of all the collection points as outline points of the floating window 5, determining the floating window outline corresponding to the floating window 5 based on the outline points of the floating window 5.

204, determining relevant data based on the coordinate position and the floating window outline.

After the coordinate position and the floating window outline of the floating window 5 are determined, the coordinate position and the floating window outline of the floating window 5 together are designated as the relevant data of the floating window 5. The relevant data is used to provide data dependency foundation for forming the corresponding floating window area.

205, setting a pre-cropping area on the drawing canvas based on the relevant data;

In this embodiment, after the relevant data is determined, a cropping coordinate position and a cropping outline corresponding to the floating window 5 on the drawing canvas 3 are determined based on the relevant data. Subsequently, the pre-cropping area 6 on the drawing canvas 3 is determined based on the cropping coordinate position and the cropping outline. The pre-cropping area 6 is used to provide cropping data foundation for creating the target canvas 4 based on the drawing canvas 3.

206, checking whether the pre-cropping area is consistent with a current cropping area; if it is not, proceeding to Step 207; if it is, proceeding to Step 209.

To improve cropping efficiency, the pre-cropping area 6 is checked for consistency with the current cropping area. When the pre-cropping area 6 is consistent with the current cropping area, it indicates that the pre-cropping area 6 has already been cropped. In this case, there is no need to crop the canvas again, and the current canvas can be directly used as the target canvas 4. When the pre-cropping area 6 is not consistent with the current cropping area, it indicates that the pre-cropping area 6 has not been cropped, and there may be parts of the canvas that do not need to be cropped but have already been cropped.

207, resetting the drawing canvas;

In a case where it is determined that the pre-cropping area has not been cropped, and there is a possibility that parts of the canvas that do not need to be cropped may have been cropped, in order to ensure the integrity of the drawing canvas 3, it is necessary to reset the drawing canvas 3. This ensures that all areas of the drawing canvas 3 are fully restored.

In this embodiment, the reset of the drawing canvas 3 may refer to a reset of the entire drawing canvas 3 or specifically to a reset of only the areas on the drawing canvas 3 that have already been cropped. Specific details are not explicitly specified at this point.

208, creating a target canvas by cropping the pre-cropping area on the drawing canvas.

After the drawing canvas 3 is reset, it becomes a complete drawing canvas 3. At this point, the pre-cropping area 6 is cropped on the complete drawing canvas 3, and the cropped drawing canvas 3 serves as the target canvas 4.

In this embodiment, cropping the pre-cropping area 6 on the drawing canvas 3 is done to ensure that when the Android whiteboard 1 is being used for drawing, the display screen 2 doesn't display the writing trajectory crossing over the floating window 5 when the writing trajectory crosses over the floating window.

209, unlocking the display screen, and executing a drawing function through the target canvas.

The Step 209 in this embodiment is similar to the Step 104 in the previous embodiment, and will not be reiterated here.

Figure 3:
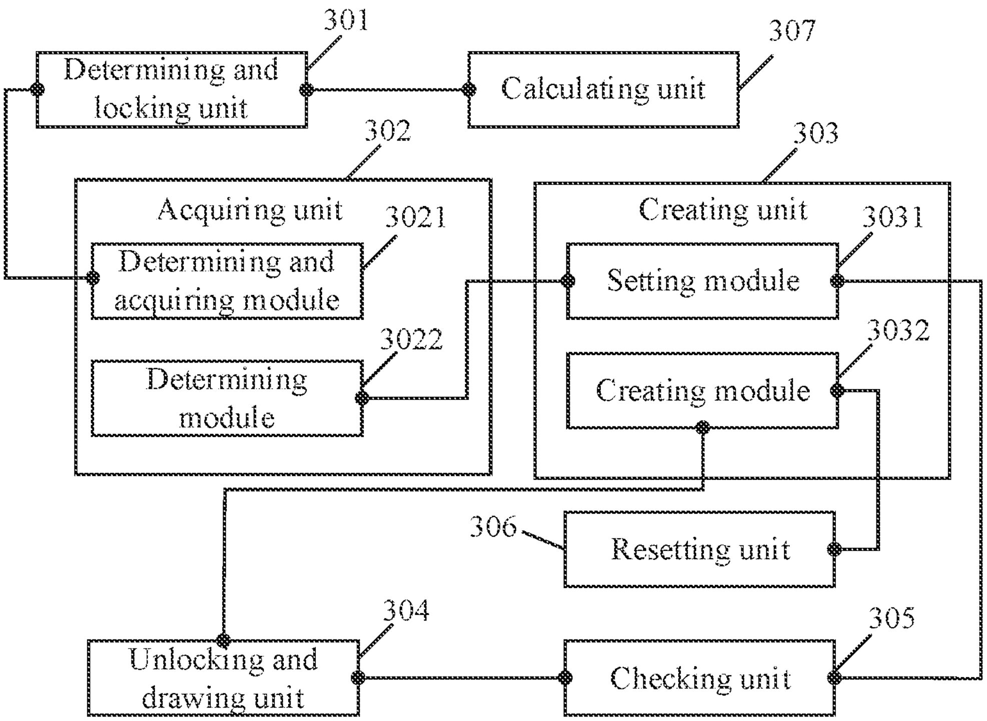
FIG. 3 is a schematic diagram of a structure of an anti-flicker apparatus for an Android whiteboard according to one of the embodiments of the present application.

Please refer to FIG. 3. An anti-flicker apparatus for an Android whiteboard provided by one of the embodiments of the present application includes:

- a determining and locking unit 301, configured to determine a drawing canvas, and lock a display screen of the Android whiteboard, wherein the display screen is used to display a canvas drawing result;
- an acquiring unit 302, configured to acquire relevant data of a floating window;
- a creating unit 303, configured to set a pre-cropping area on the drawing canvas based on the relevant data and create a target canvas by cropping the pre-cropping area on the drawing canvas;
- an unlocking and drawing unit, configured to unlock the display screen, and execute a drawing function through the target canvas.

In this embodiment, the acquiring unit 302 may include a determining and acquiring module 3021, and a determining module 3022, wherein

- the determining and acquiring module 3021 is configured to determine a coordinate position corresponding to the floating window, and acquire a floating window outline corresponding to the floating window;
- the determining module 3022 is configured to determine the relevant data based on the coordinate position and the floating window outline.

In this embodiment, the creating unit 303 may include a setting module 3031, and a creating module 3032, wherein

- the setting module 3031 is configured to set a pre-cropping area on the drawing canvas based on the relevant data;
- the creating module 3032 is configured to create a target canvas by cropping the pre-cropping area on the drawing canvas.

In this embodiment, the apparatus may further include:

- a checking unit 305, configured to check whether the pre-cropping area is consistent with a current cropping area;
- a resetting unit 306, configured to reset the drawing canvas when the checking unit 305 determines that the pre-cropping area is not consistent with the current cropping area;
- an unlocking and drawing unit 304, configured to unlock the display screen when the checking unit 305 determines that the pre-cropping area is consistent with the current cropping area, and execute a drawing function through the target canvas.

In this embodiment, the apparatus further include:

- a calculating unit 307, configured to calculate a screen size of the display screen;
- the determining and locking unit 301 is further configured to determine the drawing canvas based on the screen size.

In this embodiment, the calculating unit 307 calculates the screen size of the display screen, and sends the screen size to the determining and locking unit 301; the determining and locking unit 301 determines the drawing canvas based on the screen size, and locks the display screen of the Android whiteboard, wherein the display screen is used to display the canvas drawing result; after the drawing canvas is determined, the determining and acquiring module 3021 determines the coordinate position corresponding to the floating window, and acquires the floating window outline corresponding to the floating window; subsequently the determining module 3022 determines the relevant data based on the coordinate position and the floating window outline, and sends the relevant data to the setting module 3031; the setting module 3031 sets the pre-cropping area on the drawing canvas based on the relevant data; after the pre-cropping area is determined, the checking unit 304 checks whether the pre-cropping area is consistent with the current cropping area; when the checking unit 305 determines that the pre-cropping area is consistent with the current cropping area, the unlocking and drawing unit 304 unlocks the display screen, and executes the drawing function through the target canvas; when the checking unit 305 determines that the pre-cropping area is not consistent with the current cropping area, the resetting unit 306 resets the drawing canvas; after the drawing canvas is reset, the creating module 3032 creates the target canvas by cropping the pre-cropping area on the drawing canvas; finally, the unlocking and drawing unit 304 unlocks the display screen, and executes the drawing function through the target canvas.

In the embodiments of the present application, the determining and locking unit 301, the acquiring unit 302, the creating unit 303, the unlocking and drawing unit 304, the checking unit 305, the resetting unit 306, the calculating unit 307, the determining and acquiring module 3021, and the determining module 3022, the setting module 3031, and the creating module 3032 may each be one or more processors, controllers, or chips with a communication interface capable of implementing communication protocols. If necessary, they may also include a memory and a relevant interface, a system bus, etc. The processors, controllers, or chips execute program-related codes to implement respective functions. Alternatively, in an alternative solution, the determining and locking unit 301, the acquiring unit 302, the creating unit 303, the unlocking and drawing unit 304, the checking unit 305, the resetting unit 306, the calculating unit 307, the determining and acquiring module 3021, and the determining module 3022, the setting module 3031, and the creating module 3032 share an integrated chip or share a processor, a controller, a memory and other devices. The shared processor, controller, or chip executes program-related codes to implement the respective functions.

Figure 4:
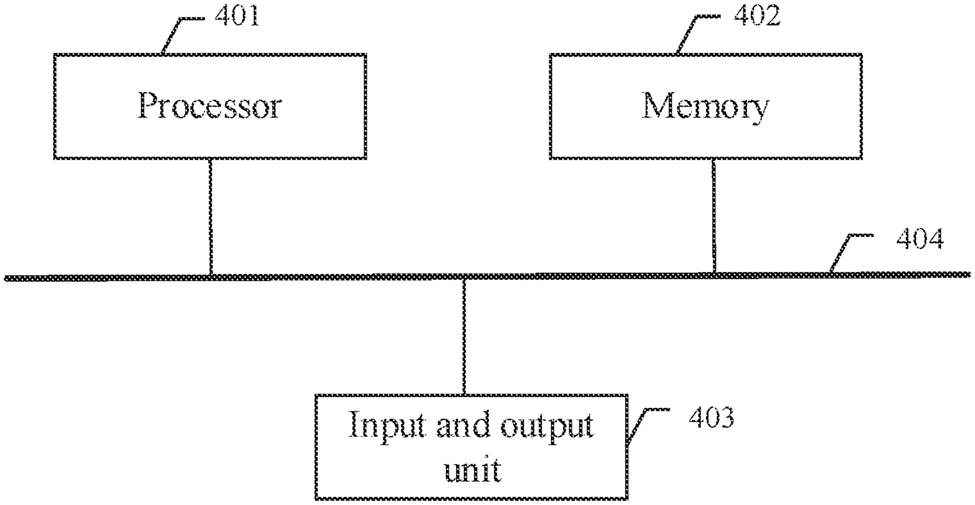
FIG. 4 is a schematic diagram of a structure of an anti-flicker apparatus for an Android whiteboard according to another one of the embodiments of the present application.

The following is a detailed description of an anti-flicker apparatus for an Android whiteboard provided by an embodiment of the present application. Please refer to FIG. 4. An anti-flicker apparatus for an Android whiteboard provided by another one of the embodiments of the present application includes:

- a processor 401, a memory 402, an input and output unit 403, and a bus 404;
- wherein the processor 401 is connected to the memory 402, the input and output unit 403, and the bus 404;
- the processor 401 executes the following operations:
- determining a drawing canvas, and locking a display screen of the Android whiteboard, wherein the display screen is used to display a canvas drawing result.
- acquiring relevant data of a floating window;
- setting a pre-cropping area on the drawing canvas based on the relevant data;

creating a target canvas by cropping the pre-cropping area on the drawing canvas, wherein the cropping includes overlay-type cropping and hidden-type cropping;

unlocking the display screen, and executing a drawing function through the target canvas.

In this embodiment, the functions of processor 401 are similar to the steps in the previous embodiments as shown in FIG. 1 and FIG. 2, and will not be reiterated here.

In the embodiments of the present application, the input and output unit 403 may be one or more processors, controllers, or chips with a communication interface capable of implementing communication protocols. If necessary, it may also include a memory and a relevant interface, a system bus, etc.

One skilled in the art should clearly understand that, for the sake of convenience and conciseness of description, the specific operational processes of the above-described systems, apparatuses, and units can be referred to the corresponding processes in the above-mentioned method embodiments and will not be reiterated here.

In the multiple embodiments of the present application, it should be understood that, the disclosed systems, apparatuses, and methods can be implemented in alternative ways. For example, the apparatus embodiments described above are merely illustrative. For example, the division of the units is just a logical functional division, and in actual implementation, alternative divisions are possible. For example, multiple units or components may be combined or integrated into another system, and some features may be omitted or not executed. Additionally, the coupling or direct coupling or communication connection presented or discussed above between each other may be indirectly coupling or communication connection through interfaces, apparatuses, or units, and can take various forms such as electricity, mechanics, or others.

The units described as separate components may or may not be physically distinct. The components presented as units may or may not be physical units, meaning they could be located in one place or distributed across multiple network units. Some or all of the units may be chosen based on actual needs to achieve the objectives of the embodiments.

Additionally, the various functional units in each embodiment of this application may be integrated into one processing unit. They may also exist physically as separate units or each two or more units are integrated into one unit. The integrated units mentioned above can be implemented in the form of hardware or be implemented in the form of software functional units.

If the integrated units are implemented in the form of software functional units and sold or used as independent products, they can be stored in a computer-readable storage medium. Based on this understanding, the essence of the technical solutions of this application, or the part that contributes to the prior art, or all/part of the technical solutions may be embodied in the form of a software product. The computer software product is stored in a storage medium and includes multiple instructions to enable a computer device (such as a personal computer, a server, or a network device, etc.) to execute all or part of the steps of the methods described in various embodiments of this application. The above-mentioned storage medium includes various media capable of storing program code, such as a USB flash drive, a mobile hard disk, a read-only memory (ROM), a random access memory (RAM), a magnetic disk, or an optical disk.

The invention claimed is:

1. An anti-flicker method for an electronic whiteboard, wherein the method comprises:

determining a drawing canvas, and locking a display screen of the electronic whiteboard, wherein the display screen is used to display a canvas drawing result;

acquiring relevant data of a floating window; wherein the relevant data is location data used to determine a corresponding location of the floating window;

determining a location area corresponding to the floating window on the drawing canvas based on the relevant data, and designating the location area as a pre-cropping area;

creating a target canvas by cropping the pre-cropping area on the drawing canvas, wherein the cropping comprises overlay-type cropping and hidden-type cropping;

unlocking the display screen, and executing a drawing function through the target canvas.

2. The method according to claim 1, wherein the process of acquiring relevant data of a floating window comprises:

determining a coordinate position corresponding to the floating window, and acquiring a floating window outline corresponding to the floating window;

determining the relevant data based on the coordinate position and the floating window outline.

3. The method according to claim 2, wherein before the process of creating a target canvas by cropping the pre-cropping area on the drawing canvas, the method further comprises:

checking whether the pre-cropping area is consistent with a current cropping area;

if it is not, resetting the drawing canvas.

4. The method according to claim 3, wherein before the process of determining a drawing canvas, the method further comprises:

calculating a screen size of the display screen;

the process of determining a drawing canvas comprises:

determining the drawing canvas based on the screen size.

5. The method according to claim 2, wherein before the process of determining a drawing canvas, the method further comprises:

calculating a screen size of the display screen;

the process of determining a drawing canvas comprises:

determining the drawing canvas based on the screen size.

6. The method according to claim 1, wherein before the process of determining a drawing canvas, the method further comprises:

calculating a screen size of the display screen;

the process of determining a drawing canvas comprises:

determining the drawing canvas based on the screen size.

7. An anti-flicker apparatus for an electronic whiteboard, wherein the apparatus comprises:

a determining and locking unit, configured to determine a drawing canvas, and lock a display screen of the electronic whiteboard, wherein the display screen is used to display a canvas drawing result;

an acquiring unit, configured to acquire relevant data of a floating window; wherein the relevant data is location data used to determine a corresponding location of the floating window;

a setting unit, configured to determine a location area corresponding to the floating window on the drawing canvas based on the relevant data, and designate the location area as a pre-cropping area;

a creating unit, configured to create a target canvas by cropping the pre-cropping area on the drawing canvas, wherein the cropping comprises overlay-type cropping and hidden-type cropping;

an unlocking and drawing unit, configured to unlock the display screen, and execute a drawing function through the target canvas.

8. The apparatus according to claim 7, wherein the acquiring unit comprises:

a determining and acquiring module, configured to determine a coordinate position corresponding to the floating window, and acquire a floating window outline corresponding to the floating window;

a determining module, configured to determine the relevant data based on the coordinate position and the floating window outline.

9. The apparatus according to claim 8, wherein the apparatus further comprises:

a checking unit, configured to check whether the pre-cropping area is consistent with a current cropping area;

a resetting unit, configured to reset the drawing canvas when the checking unit determines that the pre-cropping area is not consistent with the current cropping area.

10. The apparatus according to claim 9, wherein the apparatus further comprises: a calculating unit, configured to calculate a screen size of the display screen;

the determining and locking unit is further configured to determine the drawing canvas based on the screen size.

11. The apparatus according to claim 8, wherein the apparatus further comprises: a calculating unit, configured to calculate a screen size of the display screen;

the determining and locking unit is further configured to determine the drawing canvas based on the screen size.

12. The apparatus according to claim 7, wherein the apparatus further comprises: a calculating unit, configured to calculate a screen size of the display screen;

the determining and locking unit is further configured to determine the drawing canvas based on the screen size.

* * * * *